United States Patent
Sorensen et al.

(10) Patent No.: US 6,616,884 B1
(45) Date of Patent: Sep. 9, 2003

(54) REMOVAL OF CABLE TIE FROM MOLD PARTS

(75) Inventors: Soren Christian Sorensen, Cayman Islands (KY); Jens Ole Sorensen, Cayman Islands (KY)

(73) Assignee: Soren Christian Sorensen, Grand Cayman (KY)

(*) Notice: Subject to any disclaimer, the term of this patent is extended or adjusted under 35 U.S.C. 154(b) by 0 days.

(21) Appl. No.: 09/817,816

(22) Filed: Mar. 26, 2001

(51) Int. Cl.⁷ ............................................... B29C 45/44

(52) U.S. Cl. .................. 264/318; 264/328.1; 264/334; 264/335; 425/556

(58) Field of Search .................. 264/328.1, 318, 264/334, 335, 336; 425/437, 443, 556, DIG. 58

(56) References Cited

U.S. PATENT DOCUMENTS

| | | | |
|---|---|---|---|
| 2,875,472 A | * 3/1959 | Marcuis ..................... 249/68 |
| 2,929,105 A | 3/1960 | Starck et al. |
| 3,093,865 A | 6/1963 | Peters et al. |
| 3,159,878 A | 12/1964 | Scott, Jr. et al. |
| 3,537,676 A | 11/1970 | Miller |
| 3,660,869 A | * 5/1972 | Caveney et al. .......... 24/16 PB |
| 3,737,490 A | 6/1973 | Nicholson |
| 3,739,429 A | 6/1973 | Kohke |
| 3,776,676 A | 12/1973 | Kessler |
| 3,898,315 A | 8/1975 | Haag |
| 3,924,299 A | 12/1975 | McCormick |
| 3,965,538 A | 6/1976 | Caveney et al. |
| 4,005,164 A | 1/1977 | Procter |
| 4,076,483 A | 2/1978 | Smirne |
| 4,192,701 A | 3/1980 | Martin et al. |
| 4,238,106 A | 12/1980 | Willingham |
| 4,354,995 A | 10/1982 | Wiechard |
| 4,427,618 A | 1/1984 | Sorensen |
| 4,432,127 A | 2/1984 | Diazzi |
| 4,473,524 A | 9/1984 | Paradis |
| 4,562,990 A | 1/1986 | Rose |
| 4,666,323 A | 5/1987 | Kessler |
| 4,688,302 A | 8/1987 | Caveney et al. |
| 4,730,615 A | 3/1988 | Sutherland et al. |
| 4,776,067 A | 10/1988 | Sorensen |
| 4,793,793 A | 12/1988 | Swenson et al. |
| 4,833,741 A | 5/1989 | Mizuno et al. |
| 4,880,587 A | 11/1989 | Fichlseder et al. |
| 4,902,218 A | 2/1990 | Leonard et al. |
| 4,944,475 A | 7/1990 | Ono et al. |
| 5,002,480 A | 3/1991 | Gellert et al. |
| 5,006,288 A | 4/1991 | Rhodes, Jr. et al. |

(List continued on next page.)

FOREIGN PATENT DOCUMENTS

| | | |
|---|---|---|
| DE | 1145783 | 3/1963 |
| DE | 1485656 | 2/1970 |
| DE | 1800861 | 5/1970 |
| DE | 1778056 | 7/1971 |
| GB | 1006373 | 9/1965 |
| GB | 1287651 | 9/1972 |

OTHER PUBLICATIONS

Patent Abstracts of Japan, Publication No. 60196232, Apr. 10, 1985.

*Primary Examiner*—Jill L. Heitbrink
(74) *Attorney, Agent, or Firm*—Edward W Callan

(57) ABSTRACT

A cable tie having a locking head and a strap terminating in a tip is formed by injecting plastic material into a mold cavity defined by a first mold part that includes a head region defining a portion of the head and a second mold part that includes a tip region defining a portion of the tip. Upon initial separation of the mold parts a portion of the head is retained in the head region of the first mold part and a portion of the tip is retained in the tip region of the second mold part. Upon further separation of the mold parts, the tip is still retained in the tip region of the second mold part and the head is removed from the head region of the first mold part. Subsequently, the tip of the cable tie is ejected from the tip region of the second mold part.

13 Claims, 10 Drawing Sheets

U.S. PATENT DOCUMENTS

| | | |
|---|---|---|
| 5,028,225 A | 7/1991 | Staheli |
| 5,042,535 A | 8/1991 | Schlottke |
| 5,053,179 A | 10/1991 | Masui et al. |
| 5,096,651 A | 3/1992 | le Comte |
| 5,123,686 A | 6/1992 | Wenk |
| 5,131,613 A | 7/1992 | Kamiya et al. |
| 5,135,694 A | 8/1992 | Akahane et al. |
| 5,146,654 A | 9/1992 | Caveney et al. |
| 5,372,773 A | 12/1994 | Sorensen et al. |
| 5,693,282 A | 12/1997 | Sorensen et al. |
| 6,187,247 B1 * | 2/2001 | Buzzell et al. .............. 264/334 |
| 6,217,813 B1 | 4/2001 | Sorensen et al. |
| 6,528,004 B1 * | 3/2003 | Sorensen et al. ........... 264/318 |

* cited by examiner

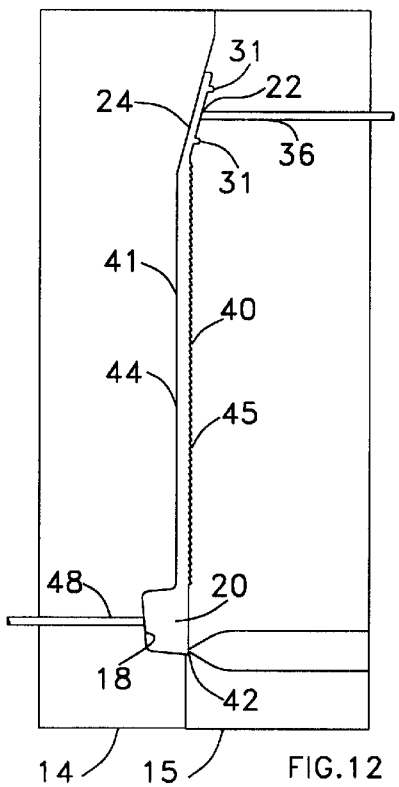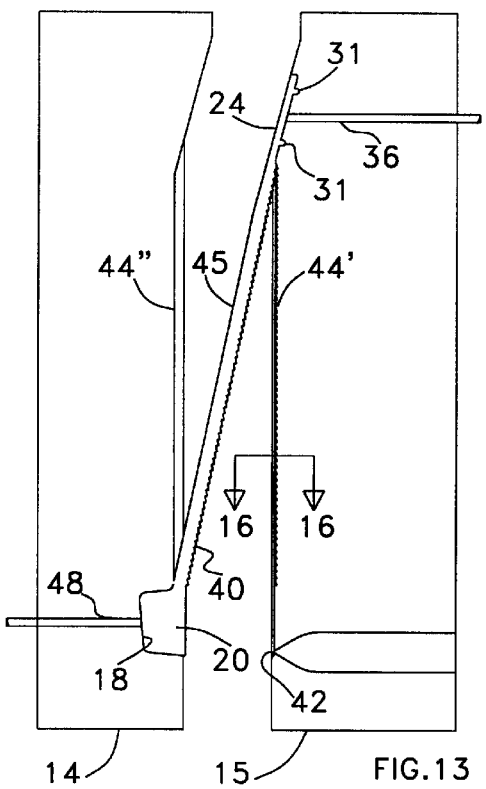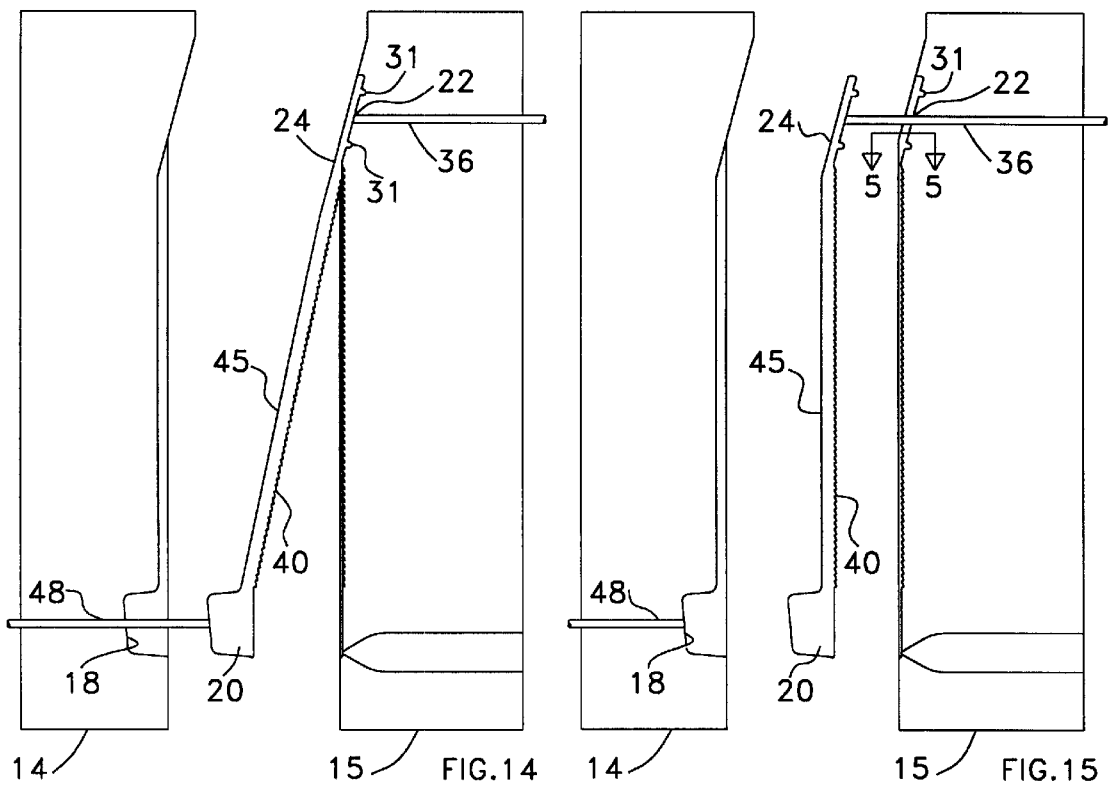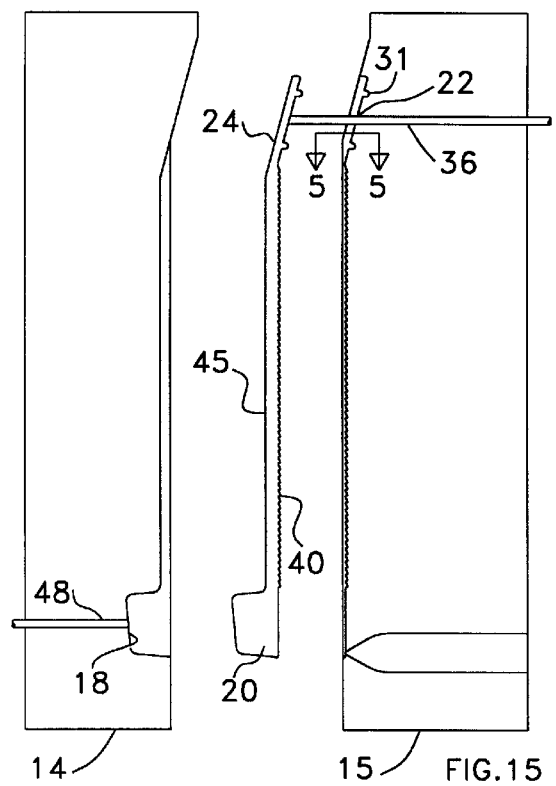

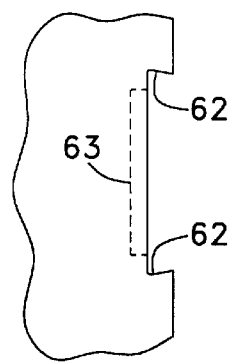
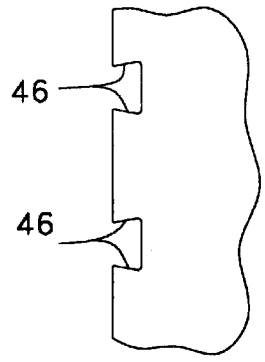
FIG.25  FIG.16
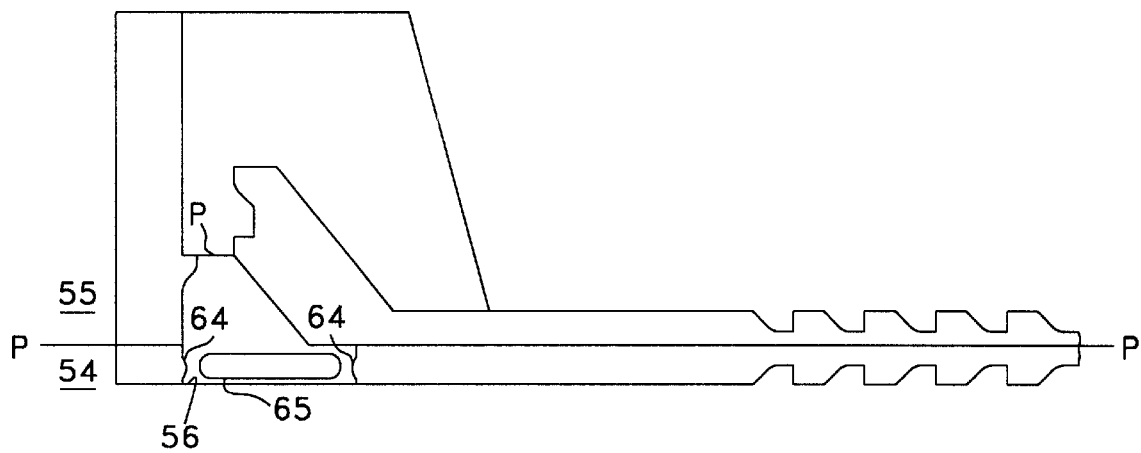
FIG.26

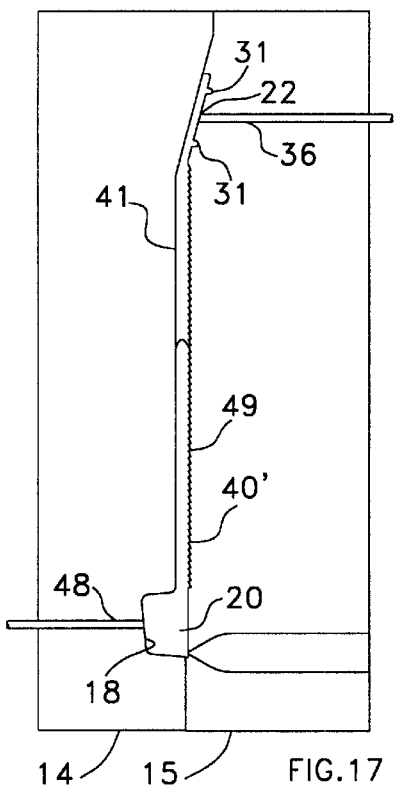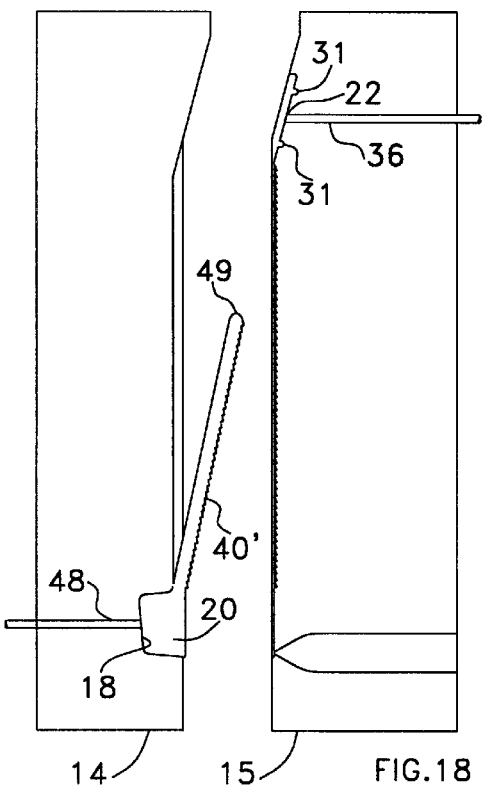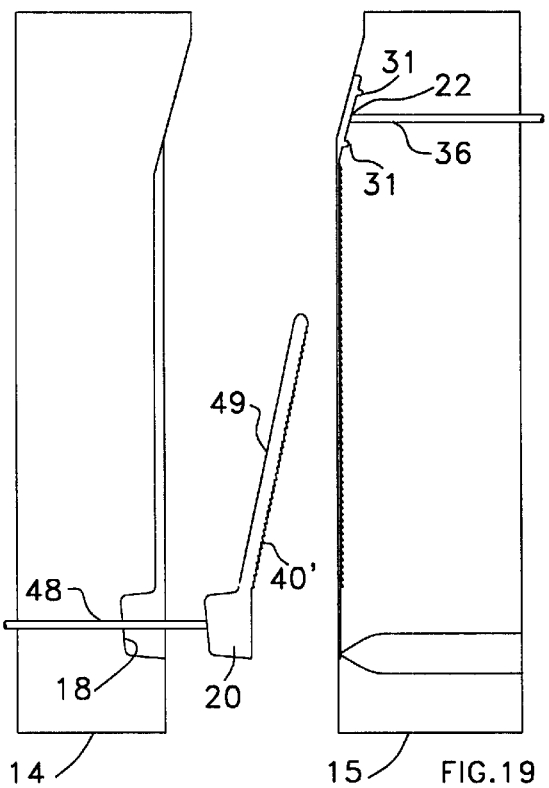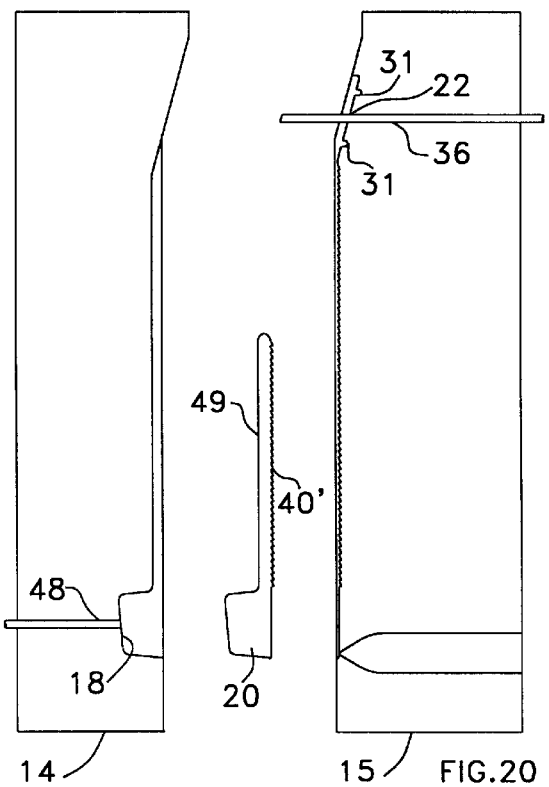

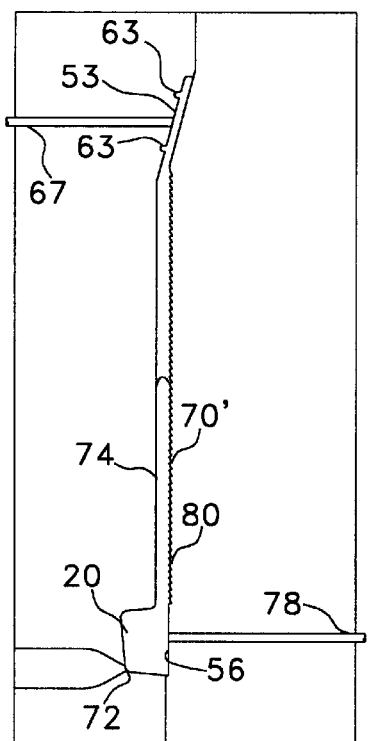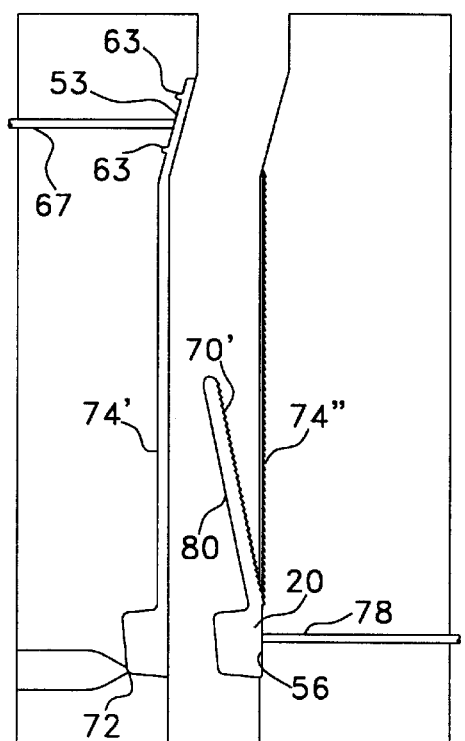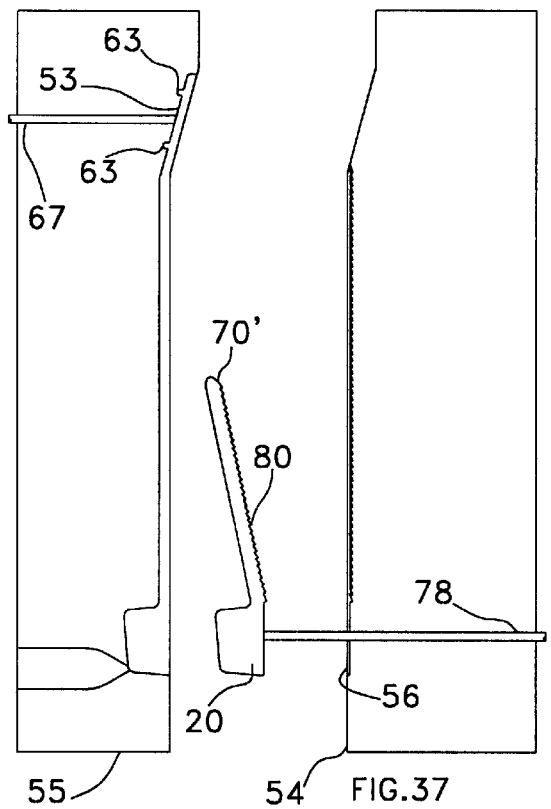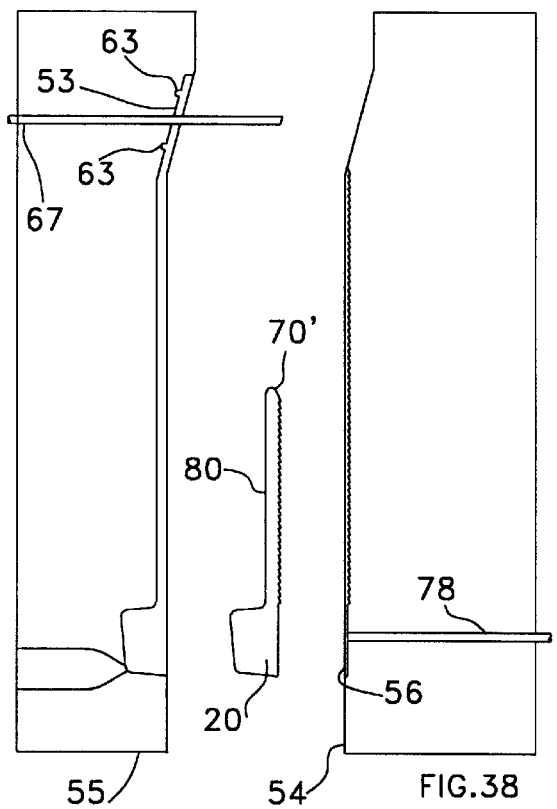

REMOVAL OF CABLE TIE FROM MOLD PARTS

BACKGROUND OF THE INVENTION

The present invention generally pertains to injection molding of cable ties, and is particularly directed to methods that facilitate removal of a cable tie from the mold parts.

A cable tie may be used for bundling together articles such as cables or the like by forming and locking a closed loop around the articles. Cable ties also have other uses. Cable ties are also known as cable straps, cable clamps, cable clips, bundling ties, bundling straps, bundling clips, bundle ties, bundling belts, wire ties, ring clamps, adjustable clamps, harnessing devices, strap seals, binding straps, and ties. A cable tie includes a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head. A cable tie may or may not include additional components; and the strap may have two or more sides, one, some or all of which include ratchet teeth. Examples of cable ties are described in U.S. Pat. Nos. 3,739,429; 3,924,299; 3,965,538; 4,473,524; 4,573,242 and 5,372,773.

Cable ties are manufactured economically by a cyclic injection molding method, in which molten plastic material is injected into a mold cavity defining the cable tie and then allowed to solidify within the mold cavity. The mold parts defining the mold cavity are then separated and the cable tie is removed from the mold parts. A preferred plastic material for cable ties is nylon, although other plastic materials may be used.

One method of injection molding a typical cable tie, as described above, that facilitates removal of the cable tie from the mold parts is described in U.S. Pat. No. 5,372,773. Such method includes the steps of:

(a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the head of the cable tie in the head region of the first mold part to thereby remove said portion of the tip of the cable tie from the tip region of the second mold part; and (d) subsequent to step (c), removing the head of the cable tie from the head region of the first mold part.

SUMMARY OF THE INVENTION

The present invention provides a method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the tip of the cable tie in the tip region of the second mold part;

(d) removing said portion of the head of the cable tie from the head region of the first mold part; and (e) subsequent to steps (c) and (d), ejecting the tip of the cable tie from the tip region of the second mold part.

In another aspect of the present invention, subsequent to step (b), the previously retained portion of the head of the cable tie is ejected from the head region of the first mold part while still retaining a portion of the tip of the cable tie in the tip region of the second mold part.

In still another aspect of the present invention, subsequent to step (b), the first mold part is further separated from the second mold part while still retaining a portion of the tip of the cable tie in the tip region of the second mold part to thereby remove the previously retained portion of the head of the cable tie from the head region of the first mold part.

In yet another aspect of the present invention, in which the plastic material is injected through a gate located in either the first mold part or the second mold part, subsequent to separation of the first and second mold parts, the previously retained portion of the head or the previously retained portion of the tip is ejected by using at least one ejector pin located in the one of the first or second mold parts in which the gate is not located.

In still a further aspect of the present invention, in which the plastic material is injected through a gate located in the first mold part, an undercut located in the second mold part is used to retain a portion of the tip of the cable tie in the tip region of the second mold part as the first and second mold parts are separating from one another.

In yet still a further aspect of the present invention, in which the mold parts define a strap region for forming the portion of the strap that extends between the head and the tip of the cable tie; and in which the plastic material is injected through a gate located adjacent either the tip region or the head region, an undercut located in the strap region of the one of the first or second mold parts in which the tip region or the head region that is adjacent the gate is not located is used to pull at least a portion of the strap from the portion of the strap region defined by the one of the first or second mold parts in which the tip region or the head region that is adjacent the gate is located, as the first and second mold parts are separating from one another.

Additional features of the present invention are described with reference to the detailed description of the preferred embodiments.

BRIEF DESCRIPTION OF THE DRAWING

FIG. 12 is a diagram showing formation of a cable tie in a mold cavity defined by the mold parts in another preferred embodiment of the present invention.

FIG. 13 is a diagram showing retention of a portion of the tip of the cable tie in one mold part and retention of a portion of the head of the cable tie in the other mold part upon initial separation of the mold parts in the embodiment of FIG. 12.

FIG. 14 is a diagram showing retention of a portion of the tip of the cable tie in the one mold part and removal of the portion of the head of the cable tie from the other mold part upon further separation of the mold parts in the embodiment of FIG. 12.

FIG. 15 is a diagram showing subsequent ejection of the portion of the tip of the cable tie from the one mold part in the embodiment of FIG. 12.

FIG. 16 illustrates undercuts within one of the respective strap regions of the two mold parts in the embodiments of FIG. 12 and 21, as seen along lines 16—16 in FIGS. 13 and 22.

FIGS. 17–20 are diagrams showing what occurs during the sequential stages of the embodiment of FIG. 12, as respectively shown in FIGS. 12–15, when the amount of injected molten plastic material is insufficient to reach the tip region of the mold cavity.

FIG. 25 illustrates undercuts within the tip region of the one mold part in the embodiments of FIGS. 21 and 31, as seen along lines 25—25 in FIGS. 24 and 34.

FIG. 26 illustrates undercuts in the head region of the other mold part in an enlarged view of an area 26 in FIG. 27 encompassing the head region of the mold cavity in the embodiment of FIG. 21.

FIGS. 35–38 are diagrams showing what occurs during the sequential stages of the embodiment of FIG. 31, as respectively shown in FIGS. 31–34, when the amount of injected molten plastic material is insufficient to reach the tip region of the mold cavity.

DETAILED DESCRIPTION

Figure 1:
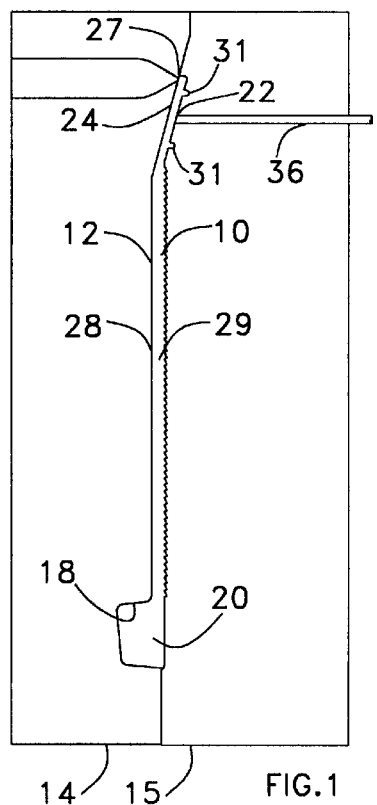
FIG. 1 is a diagram showing formation of a cable tie in a mold cavity defined by the mold parts in one preferred embodiment of the present invention.

Referring to FIGS. 1–4, in one preferred embodiment, a cable tie 10 is formed, as shown in FIG. 1, by injecting molten plastic material into a mold cavity 12 defined by a first mold part 14 combined with a second mold part 15. The first mold part 14 includes a head region 18 defining a portion of the head 20 of the cable tie 10; and the second mold part 15 includes a tip region 22 defining a portion of the tip 24 of the cable tie 10. The molten plastic material is injected into the mold cavity 12 through a gate 27 that is located in the first mold cavity 14 adjacent the tip region 22. The first and second mold parts 14, 15 further define a strap region 28 for forming the portion of the strap 29 of the cable tie 10 that extends between the head 20 and the tip 24 of the cable tie 10.

Figure 2:
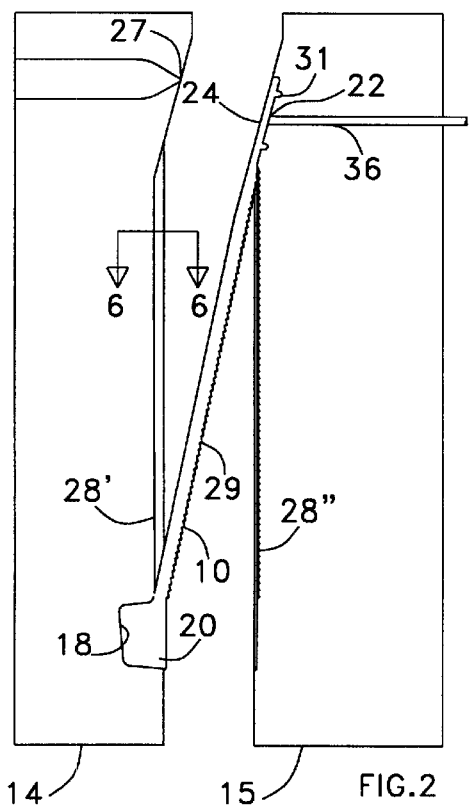
FIG. 2 is a diagram showing retention of a portion of the tip of the cable tie in one mold part and retention of a portion of the head of the cable tie in the other mold part upon initial separation of the mold parts in the embodiment of FIG. 1.

The first mold part 14 is initially separated from the second mold part 15, as shown in FIG. 2, while retaining a portion of the head 20 in the head region 18 of the first mold part 14 and a portion of the tip 24 in the tip region 22 of the second mold part 15; whereupon the head 20 is separated from the second mold part 15, the tip 24 is separated from the first mold part 14, and a major portion of the strap 29 of the cable tie 10 is separated from the first and second mold parts 14, 15.

Figure 6:
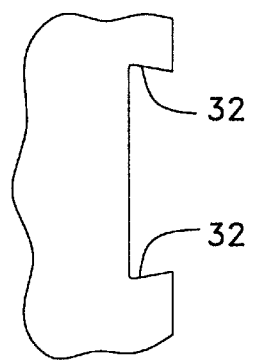
FIG. 6 illustrates undercuts within one of the respective strap regions of the two mold parts in the embodiments of FIGS. 1 and 31, as seen along lines 6—6 in FIGS. 2 and 32.
Figure 5:
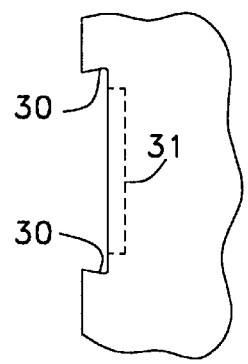
FIG. 5 illustrates undercuts within the tip region of the one mold part in the embodiments of FIGS. 1 and 12, as seen along lines 5—5 in FIGS. 4 and 15.
Figure 7:
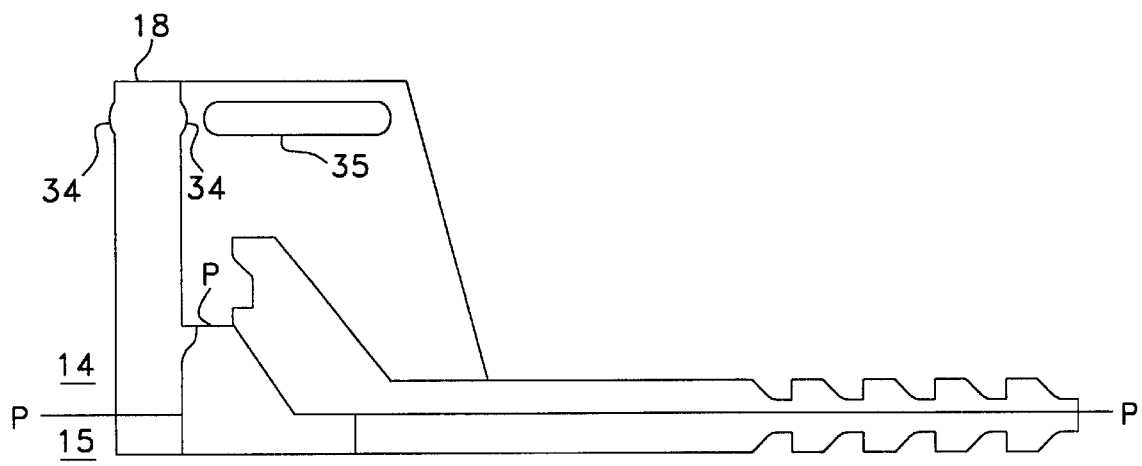
FIG. 7 illustrates undercuts in the head region of the other mold part in an enlarged view of an area 7 in FIG. 8 encompassing the head region of the mold cavity in the embodiment of FIG. 1.
Figure 8:
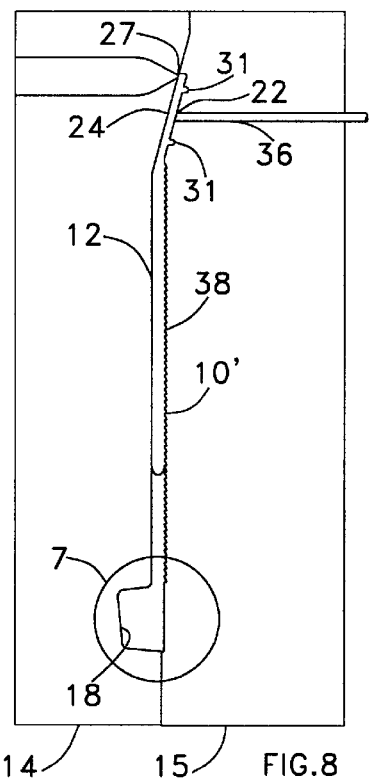
FIGS. 8–11 are diagrams showing what occurs during the sequential stages of the embodiment of FIG. 1, as respectively shown in FIGS. 1–4, when the amount of injected molten plastic material is insufficient to reach the head region of the mold cavity.

During the initial separation of the first mold part 14 from the second mold part 15, (a) undercuts 30, 31 located in the second mold part 15, as shown in FIG. 5, are used to retain a portion of the tip 24 of the cable tie 10 in the tip region 22 of the second mold part 15; (b) undercuts 32 located in the strap region 28' of the first mold part 14, as shown in FIG. 6, are used to pull at least a portion of the strap 29 from the portion of the strap region 28" defined by the second mold part 15; and (c) undercuts 34, 35 located in the first mold part 14, as shown in FIG. 7, are used to retain a portion of the head 20 of the cable tie 10 in the head region 18 of the first mold part 14. The first and second mold parts 14, 15 are separated from each other along a parting surface P shown in FIG. 7.

With regard to FIG. 7 showing a mold cavity that defines a cable tie having ratchet teeth on both sides of the strap, whereas FIGS. 1–4 show ratchet teeth on only one side of the strap, it is not material to the method of the present invention whether the strap includes teeth on one or both sides of the strap. However, the pattern of undercuts shown in FIG. 6 is preferred for a side of the strap that does not include ratchet teeth and the pattern of undercuts shown in FIG. 16 is preferred for a side of the strap that includes ratchet teeth.

Figure 3:
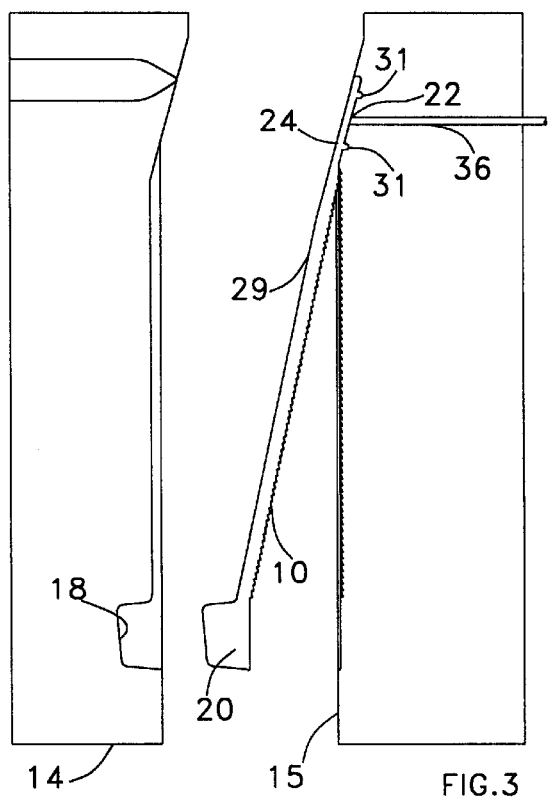
FIG. 3 is a diagram showing retention of a portion of the tip of the cable tie in the one mold part and removal of the portion of the head of the cable tie from the other mold part upon further separation of the mold parts in the embodiment of FIG. 1.
Figure 4:
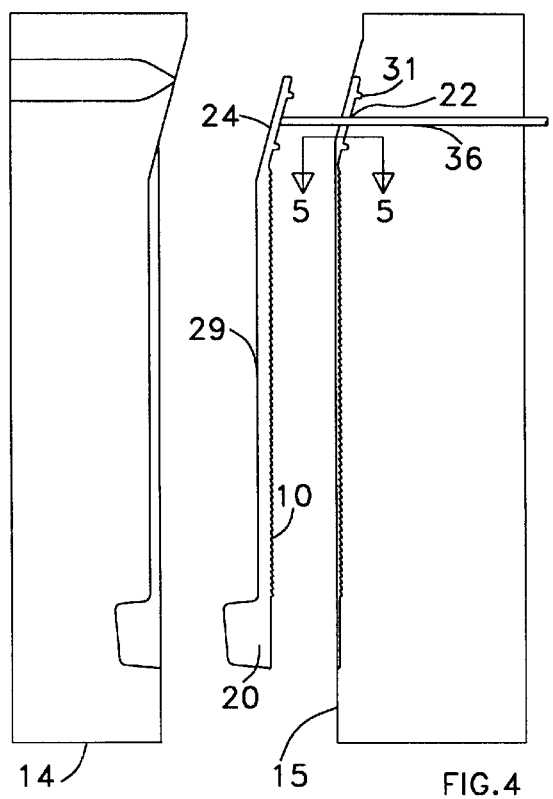
FIG. 4 is a diagram showing subsequent ejection of the portion of the tip of the cable tie from the one mold part in the embodiment of FIG. 1.

The first mold part 14 is further separated from the second mold part 15, as shown in FIG. 3, while still retaining a portion of the tip 24 in the tip region 22 of the second mold part 15, to thereby remove the previously retained portion of the head 20 of the cable tie 10 from the head region 18 of the first mold part 14. The relative dimensions of the undercuts 30, 31 in the second mold part 15 and the undercuts 34, 35 in the first mold part 14 are such that a portion of the tip 24 is still retained in the tip region 22 of the second mold part 15 during the further separation of the first and second mold parts 14, 15 and that the previously retained portion of the head 20 of the cable tie 10 is then thereby removed from the head region 18 of the first mold part 14.

Subsequently, the previously retained portion of the tip 24 of the cable tie 10 is ejected from the tip region 22 of the second mold part 15 by using at least one ejector pin 36 or preferably a plurality of ejector pins located in the second mold part 15 adjacent the tip region 22. Then the ejected cable tie 10 is removed from the space between the first and second mold parts 14, 15 by imparting a forceful fluid stream against the ejected cable tie 10, or by utilizing other means, such as robotics or gravity.

Figure 9:
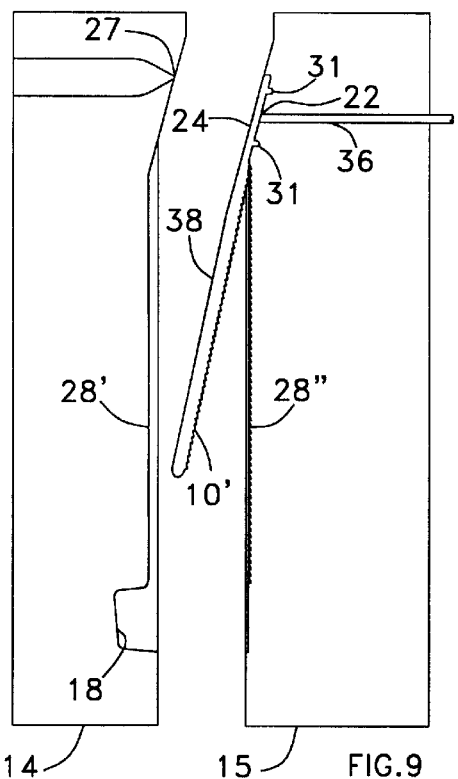
Figure 10:
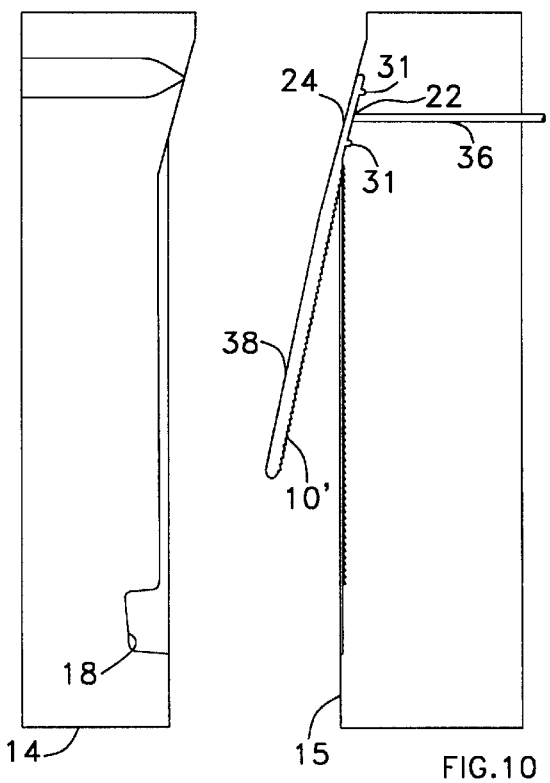
Figure 11:
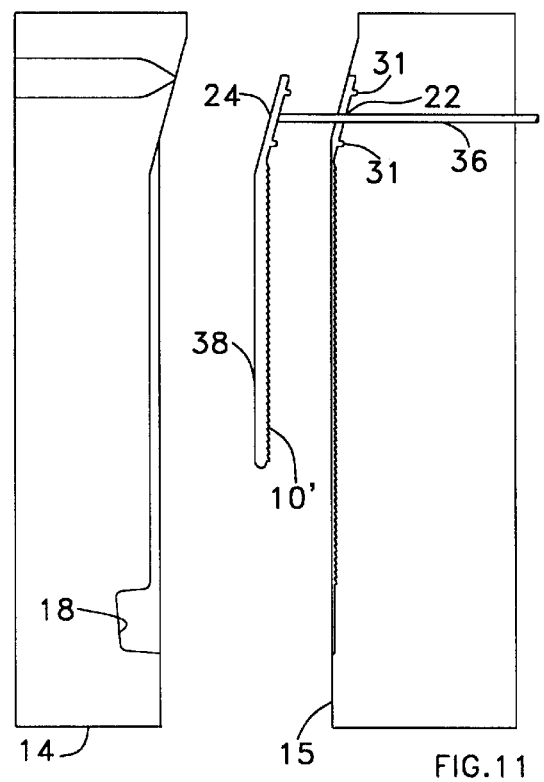

FIGS. 8–11 show that when the amount of molten plastic material injected into the mold cavity 12 through the gate 27 adjacent the tip region 22 of the second mold part 15 in the embodiment of FIGS. 1–4 is insufficient to reach the head region 18 of the mold cavity 12, such that only a partial cable tie 10' is formed, the undercuts 32 located in the strap region 28' in the first mold part 14 pull the partially formed portion of the strap 38 from the second mold. part 15 during the initial separation of the first and second mold parts 14, 15, as shown in FIG. 9, so that removal of the partially formed cable tie 10' from mold parts 14, 15 is completed upon ejecting the previously retained portion of tip 24 from the tip region 22 of the second mold part 15, as shown in FIG. 11.

Referring to FIGS. 12–16, in another preferred embodiment, a cable tie 40 is formed, as shown in FIG. 12, by injecting molten plastic material into a mold cavity 41 defined by a first mold part 14 combined with a second mold part 15. The first mold part 14 includes a head region 18 defining a portion of the head 20 of the cable tie 40; and the second mold part 15 includes a tip region 22 defining a portion of the tip 24 of the cable tie 40. The molten plastic material is injected into the mold cavity 41 through a gate 42 that is located in the second mold cavity 15 adjacent the head region 18. The first and second mold parts 14, 15 further define a strap region 44 for forming the portion of the strap 45 of the cable tie 40 that extends between the head 20 and the tip 24 of the cable tie 40.

The first mold part 14 is initially separated from the second mold part 15, as shown in FIG. 13, while retaining a portion of the head 20 in the head region 18 of the first mold part 14 and a portion of the tip 24 in the tip region 22 of the second mold part 15; whereupon the head 20 is separated from the second mold part 15, the tip 24 is separated from the first mold part 14, and a major portion of the strap 45 of the cable tie 40 is separated from the first and second mold parts 14, 15.

During the initial separation of the first mold part 14 from the second mold part 15, (a) undercuts 30, 31 located in the second mold part 15, as shown in FIG. 5, are used to retain a portion of the tip 24 of the cable tie 10 in the tip region 22 of the second mold part 15; (b) undercuts 46 located in the strap region 44' of the second mold part 15, as shown in FIG. 16, are used to pull at least a portion of the strap 45 from the portion of the strap region 44" defined by the first mold part 14; and (c) undercuts 34, 35 located in the first mold part 14, as shown in FIG. 7, are used to retain a portion of the head 20 of the cable tie 40 in the head region 18 of the first mold part 14.

The first mold part 14 is further separated from the second mold part 15, as shown in FIG. 14, while still retaining a portion of the tip 24 in the tip region 22 of the second mold part 15. Before, during or preferably subsequent to such further separation of the first and second mold parts 14, 15 from one another, the previously retained portion of the head 20 of the cable tie 40 is ejected from the head region 18 of the first mold part 14 by using at least one ejector pin 48 or preferably a plurality of ejector pins located in the first mold part 14 adjacent the head region 18, as also shown in FIG. 14.

Subsequently, the previously retained portion of the tip 24 of the cable tie 40 is ejected from the tip region 22 of the second mold part 15 by using at least one ejector pin 36 or preferably a plurality of ejector pins located in the second mold part 15 adjacent the tip region 22. Then the ejected cable tie 40 is removed from the space between the first and second mold parts 14, 15 by imparting a forceful fluid stream against the ejected cable tie 40, or by utilizing other means, such as robotics or gravity.

FIGS. 17–20 show that when the amount of molten plastic material injected into the mold cavity 41 through the gate 42 adjacent the head region 18 of the first mold part 14 in the embodiment of FIGS. 12–15 is insufficient to reach the head region 18 of the mold cavity 41, such that only a partial cable tie 40' is formed, the undercuts 46 located in the strap region 44' of the second mold part 15 pull the partially formed portion of the strap 49 from the second mold part 15 during the initial separation of the first and second mold parts 14, 15, as shown in FIG. 15, so that removal of the partially formed cable tie 40' from mold parts 14, 15 is completed upon ejecting the previously retained portion of tip 24 from the tip region 22 of the second mold part 15, as shown in FIG. 15.

Figure 21:
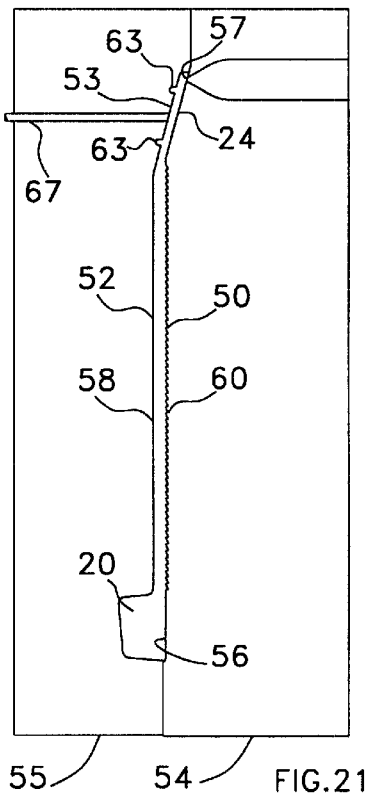
FIG. 21 is a diagram showing formation of a cable tie in a mold cavity defined by the mold parts in still another preferred embodiment of the present invention.

Referring to FIGS. 21–24, in still another preferred embodiment, a cable tie 50 is formed, as shown in FIG. 21, by injecting molten plastic material into a mold cavity 52 defined by a first mold part 54 (shown on the right) combined with a second mold part 55. The first mold part 54 includes a head region 56 defining a portion of the head 20 of the cable tie 50; and the second mold part 55 includes a tip region 53 defining a portion of the tip 24 of the cable tie 50. The molten plastic material is injected into the mold cavity 52 through a gate 57 that is located in the first mold cavity 54 adjacent the tip region 53. The first and second mold parts 54, 55 further define a strap region 58 for forming the portion of the strap 60 of the cable tie 50 that extends between the head 20 and the tip 24 of the cable tie 50.

Figure 22:
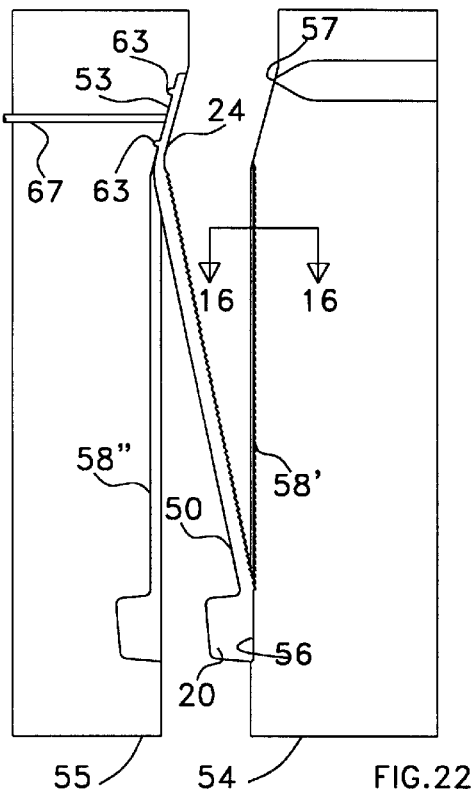
FIG. 22 is a diagram showing retention of a portion of the tip of the cable tie in one mold part and retention of a portion of the head of the cable tie in the other mold part upon initial separation of the mold parts in the embodiment of FIG. 21.

The first mold part 54 is initially separated from the second mold part 55, as shown in FIG. 22, while retaining a portion of the head 20 in the head region 56 of the first mold part 54 and a portion of the tip 24 in the tip region 53 of the second mold part 55; whereupon the head 20 is separated from the second mold part 55, the tip 24 is separated from the first mold part 54, and a major portion of the strap 60 of the cable tie 50 is separated from the first and second mold parts 54, 55.

During the initial separation of the first mold part 54 from the second mold part 55, (a) undercuts 62, 63 located in the second mold part 55, as shown in FIG. 25, are used to retain a portion of the tip 24 of the cable tie 10 in the tip region 53 of the second mold part 15; (b) undercuts 46 located in the strap region 58' of the first mold part 54, as shown in FIG. 16, are used to pull at least a portion of the strap 60 from the portion of the strap region 58" defined by the second mold part 55; and (c) undercuts 64, 65 located in the first mold part 54, as shown in FIG. 26, are used to retain a portion of the head 20 of the cable tie 50 in the head region 56 of the first mold part 54. The first and second mold parts 54, 55 are separated from each other along a parting surface P shown in FIG. 26.

Figure 23:
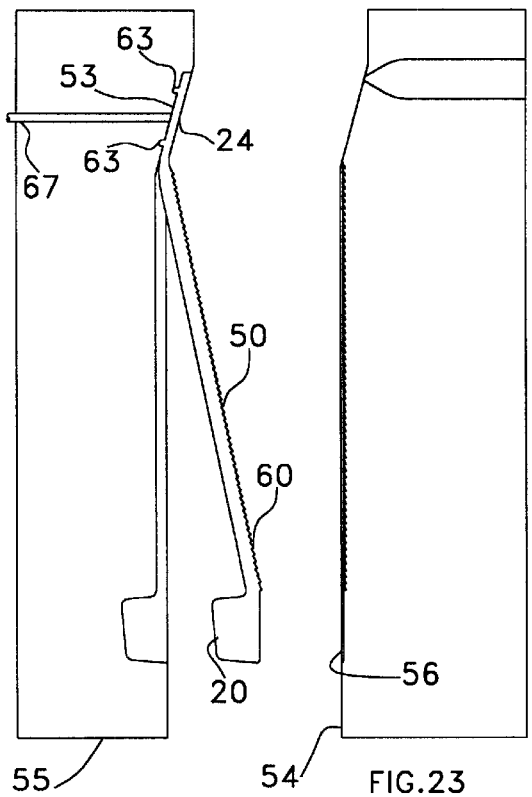
FIG. 23 is a diagram showing retention of a portion of the tip of the cable tie in the one mold part and removal of the portion of the head of the cable tie from the other mold part upon further separation of the mold parts in the embodiment of FIG. 21.
Figure 24:
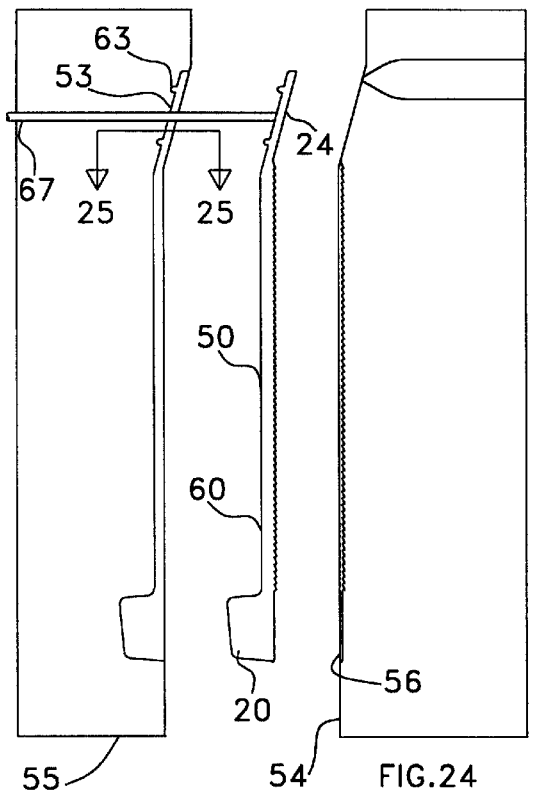
FIG. 24 is a diagram showing subsequent ejection of the portion of the tip of the cable tie from the one mold part in the embodiment of FIG. 21.
Figure 27:
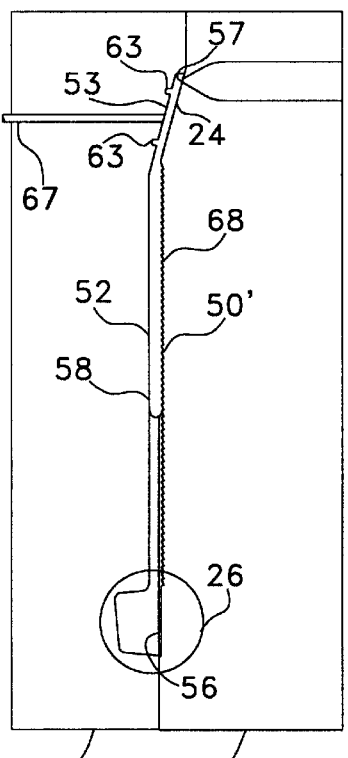
FIGS. 27–30 are diagrams showing what occurs during the sequential stages of the embodiment of FIG. 21, as respectively shown in FIGS. 21–24, when the amount of injected molten plastic material is insufficient to reach the head region of the mold cavity.

The first mold part 54 is further separated from the second mold part 15, as shown in FIG. 23, while still retaining a portion of the tip 24 in the tip region 53 of the second mold part 15, to thereby remove the previously retained portion of the head 20 of the cable tie 10 from the head region 56 of the first mold part 54. The relative dimensions of the undercuts 62, 63 in the second mold part 55 and the undercuts 64, 65 in the first mold part 54 are such that a portion of the tip 24 is still retained in the tip region 53 of the second mold part 55 during the further separation of the first and second mold parts 54, 55 and that the previously retained portion of the head 20 of the cable tie 50 is then thereby removed from the head region 56 of the first mold part 54.

Subsequently, the previously retained portion of the tip 24 of the cable tie 50 is ejected from the tip region 53 of the second mold part 55 by using at least one ejector pin 67 or preferably a plurality of ejector pins located in the second mold part 15 adjacent the tip region 53. Then the ejected cable tie 50 is removed from the space between the first and second mold parts 54, 55 by imparting a forceful fluid stream against the ejected cable tie 50, or by utilizing other means, such as robotics or gravity.

Figure 28:
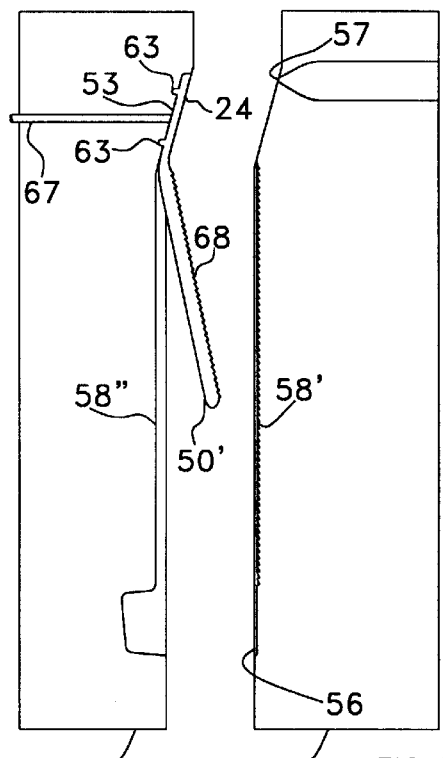
Figure 29:
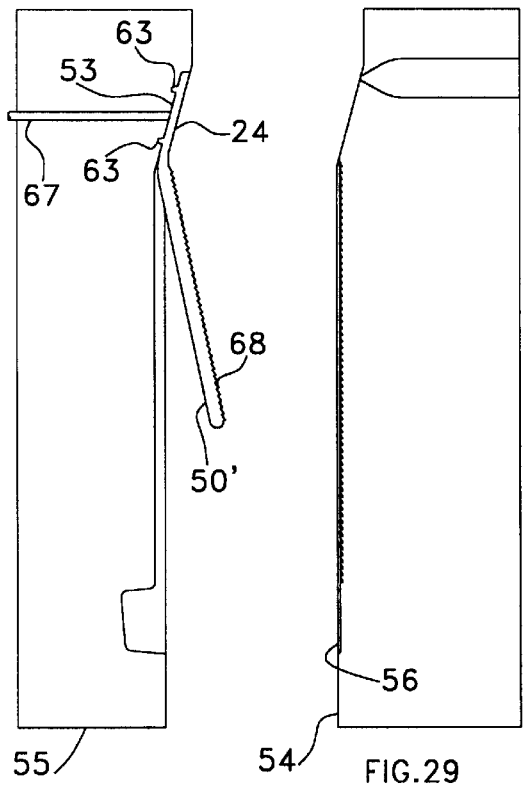
Figure 30:
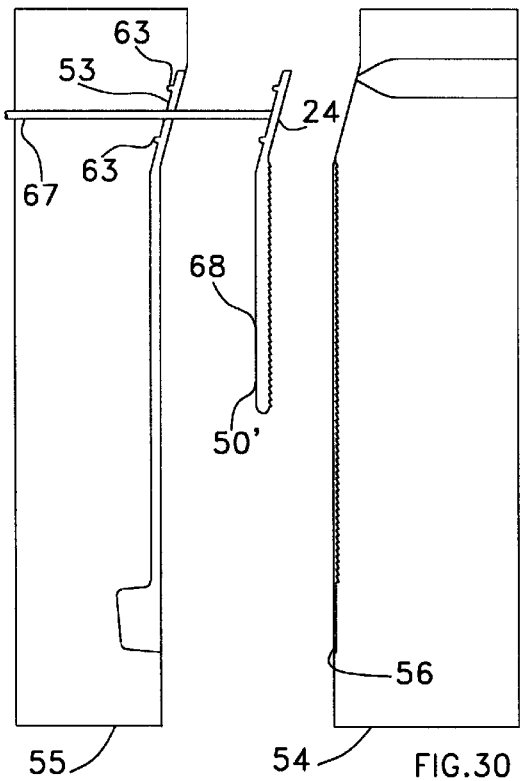

FIGS. 27–30 show that when the amount of molten plastic material injected into the mold cavity 52 through the gate 57 adjacent the tip region 53 of the second mold part 55 in the embodiment of FIGS. 21–25 is insufficient to reach the head region 56 of the mold cavity 52, such that only a partial cable tie 50' is formed, the undercuts 46 located in the strap region 58' of the first mold part 54 pull the partially formed portion of the strap 68 from the second mold part 55 during the initial separation of the first and second mold parts 54, 55, as shown in FIG. 28, so that removal of the partially formed cable tie 50' from mold parts 54, 55 is completed upon ejecting the previously retained portion of tip 24 from the tip region 53 of the second mold part 55, as shown in FIG. 30.

Figure 31:
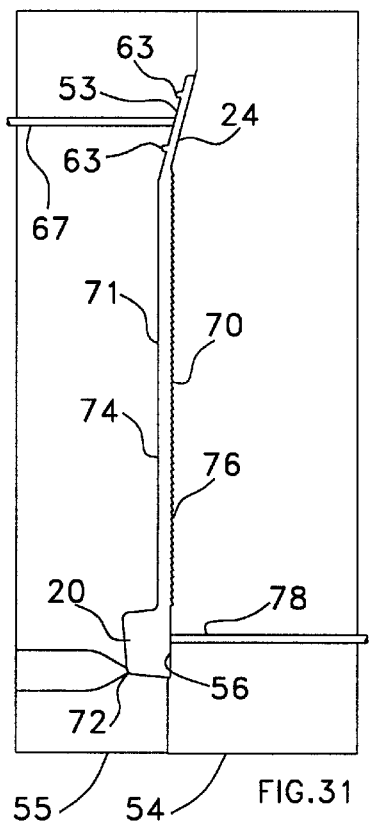
FIG. 31 is a diagram showing formation of a cable tie in a mold cavity defined by the mold parts in yet another preferred embodiment of the present invention.

Referring to FIGS. 31–34, in yet another preferred embodiment, a cable tie 70 is formed, as shown in FIG. 31, by injecting molten plastic material into a mold cavity 71 defined by a first mold part 54 combined with a second mold part 55. The first mold part 54 includes a head region 56 defining a portion of the head 20 of the cable tie 70; and the second mold part 15 includes a tip region 53 defining a portion of the tip 24 of the cable tie 70. The molten plastic material is injected into the mold cavity 71 through a gate 72 that is located in the second mold cavity 55 adjacent the head region 56. The first and second mold parts 54, 55 further define a strap region 74 for forming the portion of the strap 76 of the cable tie 70 that extends between the head 20 and the tip 24 of the cable tie 70.

Figure 32:
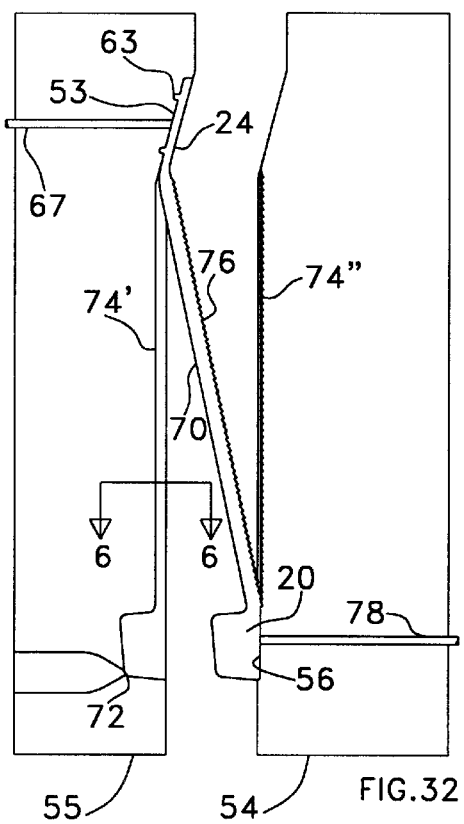
FIG. 32 is a diagram showing retention of a portion of the tip of the cable tie in one mold part and retention of a portion of the head of the cable tie in the other mold part upon initial separation of the mold parts in the embodiment of FIG. 31.

The first mold part 54 is initially separated from the second mold part 55, as shown in FIG. 32, while retaining a portion of the head 20 in the head region 56 of the first mold part 54 and a portion of the tip 24 in the tip region 53 of the second mold part 55; whereupon the head 20 is separated from the second mold part 55, the tip 24 is separated from the first mold part 54, and a major portion of the strap 76 of the cable tie 70 is separated from the first and second mold parts 54, 55.

During the initial separation of the first mold part 54 from the second mold part 55, (a) undercuts 62, 63 located in the second mold part 55, as shown in FIG. 25, are used to retain a portion of the tip 24 of the cable tie 70 in the tip region 53 of the second mold part 55; (b) undercuts 32 located in the strap region 74' of the second mold part 55, as shown in FIG. 6, are used to pull at least a portion of the strap 76 from the portion of the strap region 74" defined by the first mold part 54; and (c) undercuts 64, 65 located in the first mold part 54, as shown in FIG. 26, are used to retain a portion of the head 20 of the cable tie 50 in the head region 56 of the first mold part 54.

Figure 33:
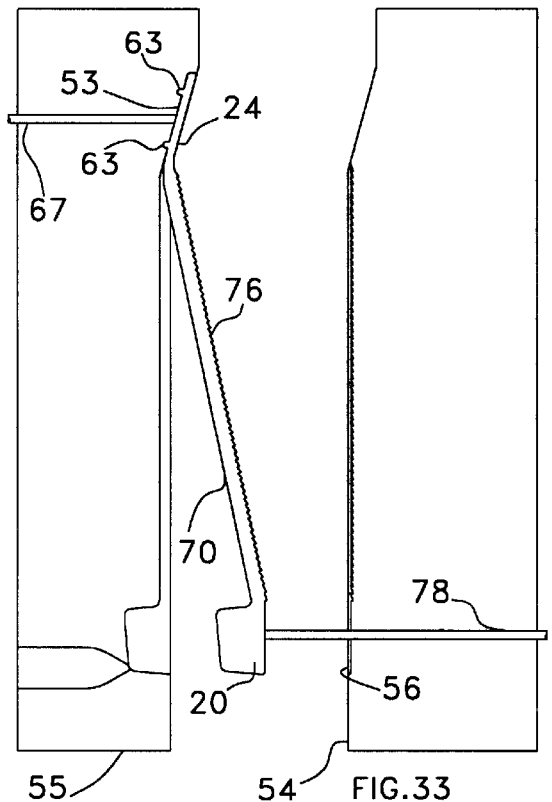
FIG. 33 is a diagram showing retention of a portion of the tip of the cable tie in the one mold part and removal of the portion of the head of the cable tie from the other mold part upon further separation of the mold parts in the embodiment of FIG. 31.
Figure 34:
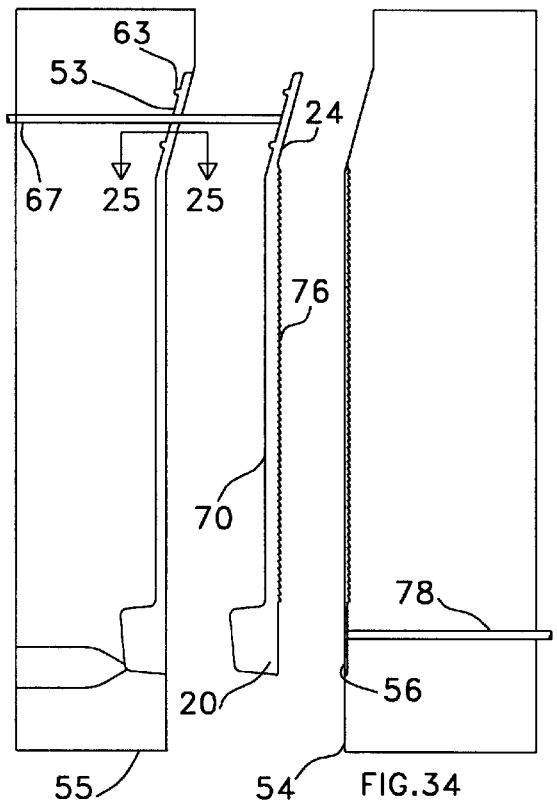
FIG. 34 is a diagram showing subsequent ejection of the portion of the tip of the cable tie from the one mold part in the embodiment of FIG. 31.

The first mold part 54 is further separated from the second mold part 55, as shown in FIG. 33, while still retaining a portion of the tip 24 in the tip region 53 of the second mold part 55. Before, during or preferably subsequent to such further separation of the first and second mold parts 54, 55 from one another, the previously retained portion of the head 20 of the cable tie 70 is ejected from the head region 56 of the first mold part 54 by using at least one ejector pin 78 or preferably a plurality of ejector pins located in the first mold part 54 adjacent the head region 56, as also shown in FIG. 33.

Subsequently, the previously retained portion of the tip 24 of the cable tie 70 is ejected from the tip region 53 of the second mold part 55 by using at least one ejector pin 67 or preferably a plurality of ejector pins located in the second mold part 55 adjacent the tip region 53. Then the ejected cable tie 70 is removed from the space between the first and second mold parts 54, 55 by imparting a forceful fluid stream against the ejected cable tie 70, or by utilizing other means, such as robotics or gravity.

FIGS. 35–38 show that when the amount of molten plastic material injected into the mold cavity 71 through the gate 72 adjacent the head region 56 of the first mold part 54 in the embodiment of FIGS. 31–34 is insufficient to reach the tip region 53 of the mold cavity 71, such that only a partial cable tie 70' is formed, the undercuts 32 located in the strap region 74' of the second mold part 55 pull the partially formed portion of the strap 80 from the second mold part 55 during the initial separation of the first and second mold parts 54, 55, as shown in FIG. 36, so that removal of the partially formed cable tie 70' from mold parts 54, 55 is completed upon ejecting the previously retained portion of tip 24 from the tip region 53 of the second mold part 55, as shown in FIG. 38.

The drawing figures do not show all of the features of the mold parts or the injection-molded cable tie, but rather show selected features that facilitate an understanding of various embodiments of the method of the present invention.

In various embodiments, not all of which are shown, (a) the molten plastic material is injected through a gate that is located in either the first mold part or the second mold part and adjacent either the tip region or the head region; (b) subsequent to separation of the first and second mold parts, the previously retained portion of the head or the previously retained portion of the tip is ejected by using ejection means located in either the one of the first or second mold parts in which the gate is not located or the one of the first or second mold parts in which the gate is located; and (c) ejection means other than ejector pins may be used, such as (i) means for imparting an air blast, or (ii) means for discontinuing retention of the portion of the head of the cable tie in the head region of the first mold part prior to full separation of the mold parts so that subsequent separation of the mold parts tugs upon and thereby ejects the head portion from the head region of the first mold part.

The undercuts in the mold parts may have any desired shape or form. It is usually desirable to make the undercuts in surfaces of the mold cavity that are perpendicular or nearly perpendicular to the mold opening direction.

Means other than undercuts, such as movable mold elements, can be used to retain the portion of the head and the portion of the tip that are retained in the respective mold parts. The movable elements are initially positioned for retaining and then repositioned for releasing.

The mold may include two or more mold parts; and the mold parts preferably define a plurality of mold cavities for forming a respective number of cable ties. Multiple mold cavities may be located in the mold along a single parting surface or in a stacked configuration that is operated in either a synchronous or desynchronous manner. It is immaterial how the mold is oriented for operation, such as horizontal, vertical, sideways, upside down, or any other position or direction.

The molten plastic material can be injected into an individual mold cavity through one or more gates via one or more mold parts by any type of runner system, such as a cold runner system, a hot runner system, an insulated runner system, a three-plate runner system, a submarine runner system, or others or combinations thereof.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the tip of the cable tie in the tip region of the second mold part;

(d) removing said portion of the head of the cable tie from the head region of the first mold part; and (e) subsequent to steps (c) and (d), ejecting the tip of the cable tie from the tip region of the second mold part.

2. A method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) subsequent to step (b) while still retaining said portion of the tip of the cable tie in the tip region of the second mold part, ejecting said portion of the head of the cable tie from the head region of the first mold part; and (d) subsequent to step (c), ejecting the tip of the cable tie from the tip region of the second mold part.

3. A method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the tip of the cable tie in the tip region of the second mold part to thereby remove said portion of the head of the cable tie from the head region of the first mold part; and (d) subsequent to step (c), ejecting the tip of the cable tie from the tip region of the second mold part.

4. A method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the tip of the cable tie in the tip region of the second mold part;

(d) removing said portion of the head of the cable tie from the head region of the first mold part; and (e) subsequent to steps (c) and (d), ejecting the tip of the cable tie from the tip region of the second mold part; wherein step (a) comprises injecting said plastic material through a gate located in either the first mold part or the second mold part; and wherein either step (d) or step (e) comprises using at least one ejector pin located in the one of the first or second mold parts in which the gate is not located.

5. A method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie and the second mold part includes a tip region defining a portion of the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the tip of the cable tie in the tip region of the second mold part;

(d) removing said portion of the head of the cable tie from the head region of the first mold part; and (e) subsequent to steps (c) and (d), ejecting the tip of the cable tie from the tip region of the second mold part;
wherein step (a) comprises injecting said plastic material through a gate located in the first mold part; and
wherein step (b) or step (c) comprises using an undercut located in the second mold part to retain said portion of the tip of the cable tie in the tip region of the second mold part.

6. A method of injection molding a cable tie having a locking head, a strap extending from the head and terminating in a tip for passing through an opening in the head, and ratchet teeth on at least one side of the strap, wherein the locking head includes a pawl having teeth with surfaces for engaging the ratchet teeth to lock the strap in the locking head after the tip end of the strap has been pulled through the opening in the head, the method comprising the steps of (a) forming the cable tie by injecting molten plastic material into a mold cavity defined by a first mold part combined with a second mold part, wherein the first mold part includes a head region defining a portion of the head of the cable tie, the second mold part includes a tip region defining a portion of the tip of the cable tie, and said mold parts further define a strap region for forming the portion of the strap that extends between the head and the tip of the cable tie;

(b) separating the first mold part from the second mold part while retaining said portion of the head of the cable tie in the head region of the first mold part and said portion of the tip of the cable tie in the tip region of the second mold part, to separate the head from the second mold part, to separate the tip from the first mold part, and to separate a major portion of the strap of the cable tie from the first and second mold parts;

(c) further separating the first mold part from the second mold part while still retaining said portion of the tip of the cable tie in the tip region of the second mold part;

(d) removing said portion of the head of the cable tie from the head region of the first mold part; and (e) subsequent to steps (c) and (d), ejecting the tip of the cable tie from the tip region of the second mold part;

wherein step (a) comprises injecting said plastic material through a gate located adjacent either the tip region or the head region; and wherein step (b) comprises using an undercut located in the strap region of the one of the first or second mold parts in which the tip region or the head region that is adjacent the gate is not located to pull at least a portion of the strap from the portion of the strap region defined by the one of the first or second mold parts in which the tip region or the head region that is adjacent the gate is located, as said mold parts are separating.

7. A method according to claim 1, 2, 3, 4 or 6, wherein step (a) includes the step of:
   (f) injecting said molten plastic material through a gate that is located in the first mold part.

8. A method according to claim 1, 2, 3, 4 or 6, wherein step (a) includes the step of:
   (f) injecting said molten plastic material through a gate that is located in the second mold part.

9. A method according to claim 1, 2, 3, 4, 5 or 6, wherein step (a) includes the step of:
   (f) injecting said molten plastic material through a gate that is located adjacent the tip region.

10. A method according to claim 1, 2, 3, 4, 5 or 6, wherein step (a) includes the step of:
    (f) injecting said molten plastic material through a gate that is located adjacent the head region.

11. A method according to claim 1, 2, 3, 4, 5 or 6, wherein step (b) comprises using an undercut located in the second mold part to retain said portion of the tip of the cable tie in the tip region of the second mold part.

12. A method according to claim 1, 2, 3, 4, 5 or 6, wherein step (d) of claim 2 or 3 or step (e) of claim 1, 4, 5 or 6 comprises using at least one ejector pin to remove the tip of the cable tie from the tip region of the second mold part.

13. A method according to claim 2, wherein step (c) comprises using at least one ejector pin to eject said portion of the head of the cable tie.

* * * * *